United States Patent [19]  [11] 4,377,383
Meyers  [45] Mar. 22, 1983

[54] TEACHING APPARATUS WITH SYSTEM FOR REPETITIVE REVIEW OF INFORMATION

[75] Inventor: John S. Meyers, Bergenfield, N.J.

[73] Assignee: Christopher Boettger, Dumont, N.J.

[21] Appl. No.: 207,367

[22] Filed: Nov. 17, 1980

[51] Int. Cl.³ .............................................. G09B 3/00
[52] U.S. Cl. .................................................. 434/348
[58] Field of Search ............... 434/347, 348, 349, 157, 434/167, 322, 327; 273/148 A; 221/312 C

[56] References Cited

U.S. PATENT DOCUMENTS 2,222,245 11/1940 Steen .................................... 434/348
3,143,348 8/1964 Carsen et al. ........................ 434/347
3,462,853 8/1969 Kunert ............................. 434/348 X Primary Examiner—William H. Grieb Attorney, Agent, or Firm—Samuelson & Jacob

[57] ABSTRACT

Teaching apparatus enabling a reviewer to review items of information to be learned by the reviewer in accordance with a prescribed routine of repetitive review of a plurality of information-bearing slips so that the review of unlearned items is more frequent than the review of learned items, the apparatus including a plurality of classification cards defining grades and classes within the grades, a tablet in the form of a board having delineated areas for separating the slips into groups which will be reviewed more frequently or less frequently, depending upon whether or not the item carried by a slip is known at the time of a particular review, and a holder for the slips, the holder being capable of holding a group of slips in a stack of variable height and enabling sequential review and removal of each slip from the stack of slips for placement on the tablet.

15 Claims, 6 Drawing Figures

TEACHING APPARATUS WITH SYSTEM FOR REPETITIVE REVIEW OF INFORMATION

The present invention relates generally to teaching devices and pertains, more specifically, to teaching apparatus for aiding students and other reviewers in memorizing or learning large numbers of facts.

A wide variety of teaching device has been made available to students and other reviewers interested in expanding their knowledge. Many of the devices currently available are highly sophisticated and relatively expensive machines with complex constructions. Where the knowledge to be learned consists of large numbers of facts, these machines are provided with high-capacity memories and complex systems for the storage and retrieval of information.

It is an object of the present invention to provide simplified apparatus for learning or memorizing large numbers of facts, such as those associated with the learning of foreign languages, history, sciences, arts and like subjects where the facts can be expressed in the form of questions and answers.

Another object of the invention is to provide teaching apparatus which enables learning or memorizing facts by a routine which includes repetitive review and which provides for a continually decreasing frequency of review of those facts learned during the course of the routine. Thus, time is conserved by eliminating excessive repetition of review of facts already memorized and review time and energy are directed more toward learning facts not already committed to memory.

Still another object of the invention is to provide teaching apparatus in which the facts to be learned are reviewed repetitively, but the sequence of the facts in each review is rearranged so that individual facts will not appear in the same sequence twice. Thus, the facts will be memorized independently, or in isolation from one another, and the recall of one fact will not be triggered by the recall of the next previous fact in a sequence.

Yet another object of the invention is to provide teaching apparatus which will aid in the organization of source material, thereby facilitating the introduction of elementary facts into the apparatus first while assuring that no necessary facts are omitted inadvertently.

A further object of the invention is to provide teaching apparatus which automatically separates memorized facts from those not yet committed to memory.

A still further object of the invention is to provide teaching apparatus which is truly portable and may be used conveniently at almost any time in a wide variety of locations.

Yet a further object of the invention is to provide teaching apparatus which is economical to manufacture and distribute and which can be used for learning almost any facts selected by the person using the apparatus.

The above objects, as well as further objects and advantages, are attained by the present invention which may be described briefly as apparatus for enabling a reviewer to review items of information to be learned by the reviewer in accordance with a prescribed routine of repetitive review of a plurality of information-bearing elements, each element carrying an item of information to be reviewed, the apparatus and routine ensuring a more frequent review of unlearned items as compared to learned items during the course of the routine, the apparatus comprising: classification means for defining a plurality of grades, the grades being arranged in a given sequence from lower grades to higher grades and for defining classes within the grades, the number of classes within each grade being greater in the higher grades than in the lower grades; and manipulation means for enabling the review and successive grouping of the elements within prescribed classes and grades in accordance with one of two choices made by the reviewer upon each review of the item of each element, such that each choice determines the frequency of review of the corresponding item subsequent to that choice as the element carrying that item follows the given sequence through the grades and classes to enable a more frequent review of some items as compared to other items during the course of the routine.

The invention will be understood more fully, while still further objects and advantages will become apparent, in the following detailed description of an embodiment of the invention illustrated in the accompanying drawing, in which.

Figure 1:
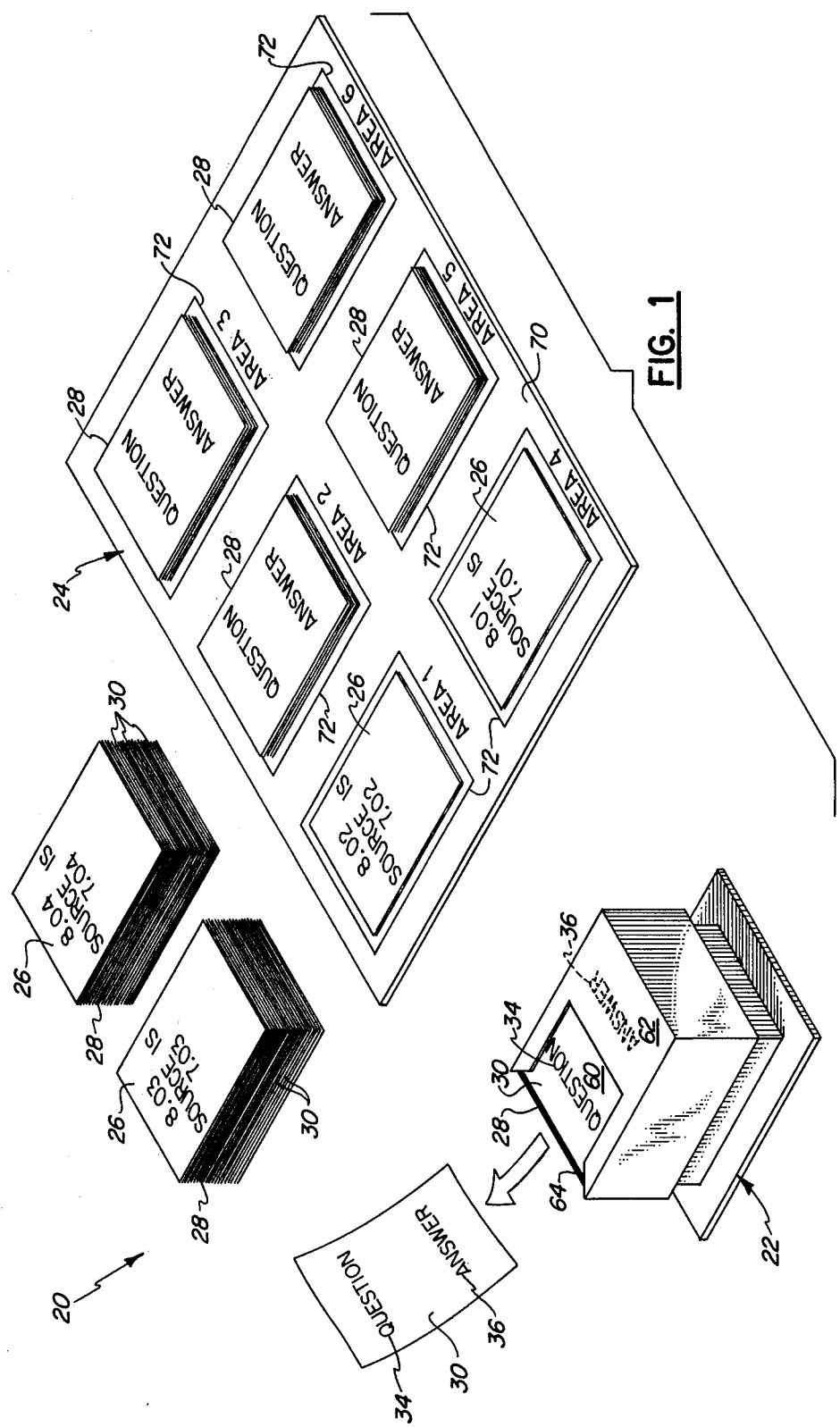
FIG. 1 is a pictorial perspective view of teaching apparatus constructed in accordance with the invention.

Referring now to the drawing, and especially to FIG. 1 thereof, teaching apparatus constructed in accordance with the invention is illustrated at 20 and is seen to include a holder 22, a tablet 24, and a plurality of class title cards 26, all of which are component parts of the teaching apparatus 20. Some of the class title cards 26 are shown each placed at the top of a stack 28 of information-bearing elements in the form of slips 30.

Figure 2:
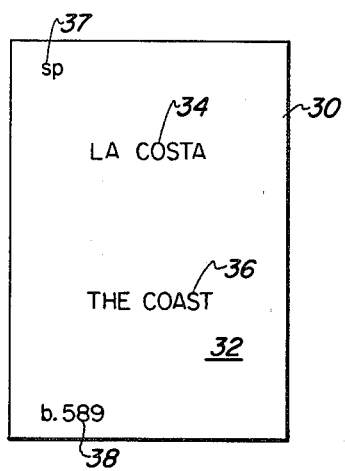
FIG. 2 is a plan view of an information-bearing element used in connection with the apparatus.

A typical slip 30 is shown in greater detail in FIG. 2. Each slip 30 may be constructed of paper or a like material which is relatively inexpensive and upon which information can be placed by printing, typing or writing. The item of information is displayed upon the face 32 of slip 30 in the form of a question 34 and an answer 36. In the illustration, slip 30 is one of a large number of slips created for a reviewer whose native language is English for the purpose of learning Spanish vocabulary. Thus, question 34 is in the form of an item in Spanish, while answer 36 is the English translation of the same item. The identification of the subject matter may be placed upon the slip, as at 37, and the identification of the reference from which the information was taken can be placed at 38; however, the subject matter identification 37 and the reference identification 38 are not necessary for the operation of teaching apparatus 20. The subject matter identification 37 is helpful in that the reviewer will be able to determine immediately the catagory into which a particular fact falls. Thus, slips bearing facts from more than one category can be intermixed and several subjects can be learned during the routine of repetitive review. With respect to the reference identification 38, even the most meticulous student is capable of making a mistake, or may believe that a mistake was made, during preparation of the slips 30. The reference identification 38 provides a rapid means for referring back to the source material for verification or correction, without requiring a time-consuming review of a number of text books to locate the source.

Figure 3:
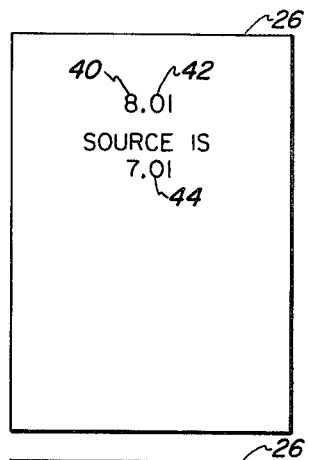
FIG. 3 is a plan view showing a plurality of classification cards which are component parts of the teaching apparatus.
Figure 3:
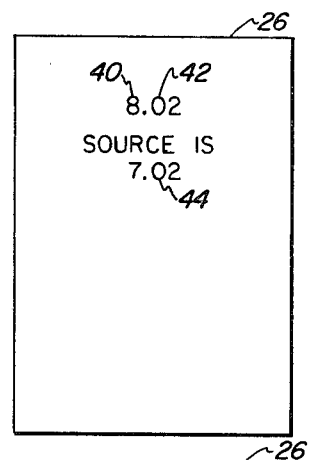
Figure 3:
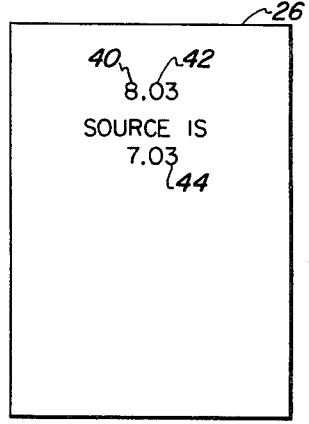
Figure 3:
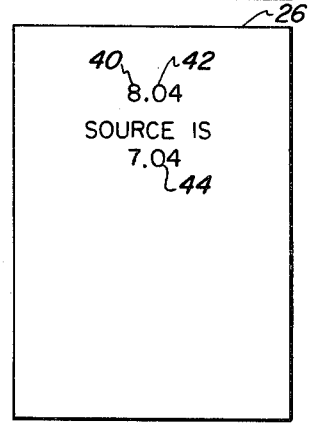

The operation of apparatus 20 relies upon classification means which defines a plurality of grades, so that the slips 30 can progress from grade to grade as the slips are reviewed, and in that way the sequence of review and the frequency of review of each slip can be adjusted merely by the routine of the review itself, based upon the number of items of information memorized by the reviewer as the routine progresses. The classification means is in the form of the class title cards 26, some of which are illustrated in detail in FIG. 3. Each card 26 preferably is constructed of paper card stock and carries indicia identifying a grade 40, a class 42 within that grade, and a source grade and class 44. The length and width or plan dimensions of the class title cards 26 are essentially the same as those of slips 30. The class title cards 26 may be color coded for added convenience in distinguishing the various grades and classes.

Teaching apparatus 20 provides eight grades for a daily routine of review. The highest grade, Grade 8, has twice the number of classes found in the next previous grade, which is Grade 7, and so on down through the grades, with the exception of Grades 3 and 2, each of which has only one class. Thus, Grade 8 has thirty-two classes, Grade 7 has sixteen classes, Grade 6 has eight classes, Grade 5 has four classes, Grade 4 has two classes and Grades 3, 2 and 1 each have one class. The total number of class title cards 26 for the daily routine, therefore, is sixty-five.

Figure 4:
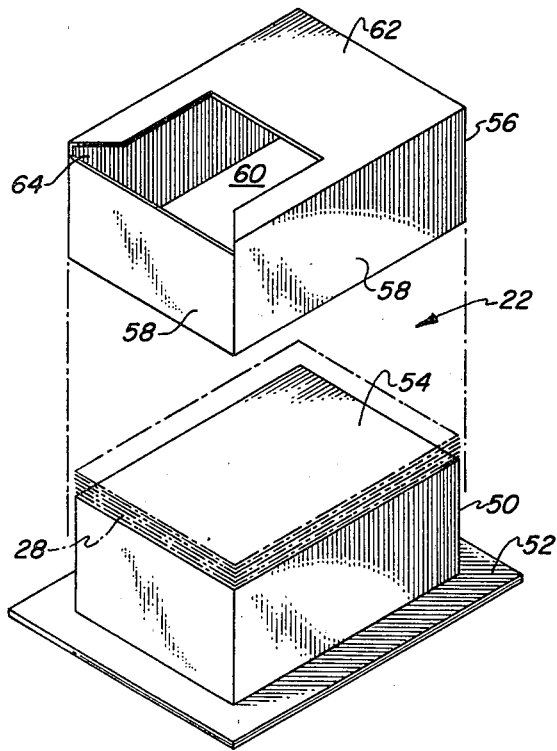
FIG. 4 is an exploded perspective view of a holder which is a component part of the teaching apparatus.
Figure 5:
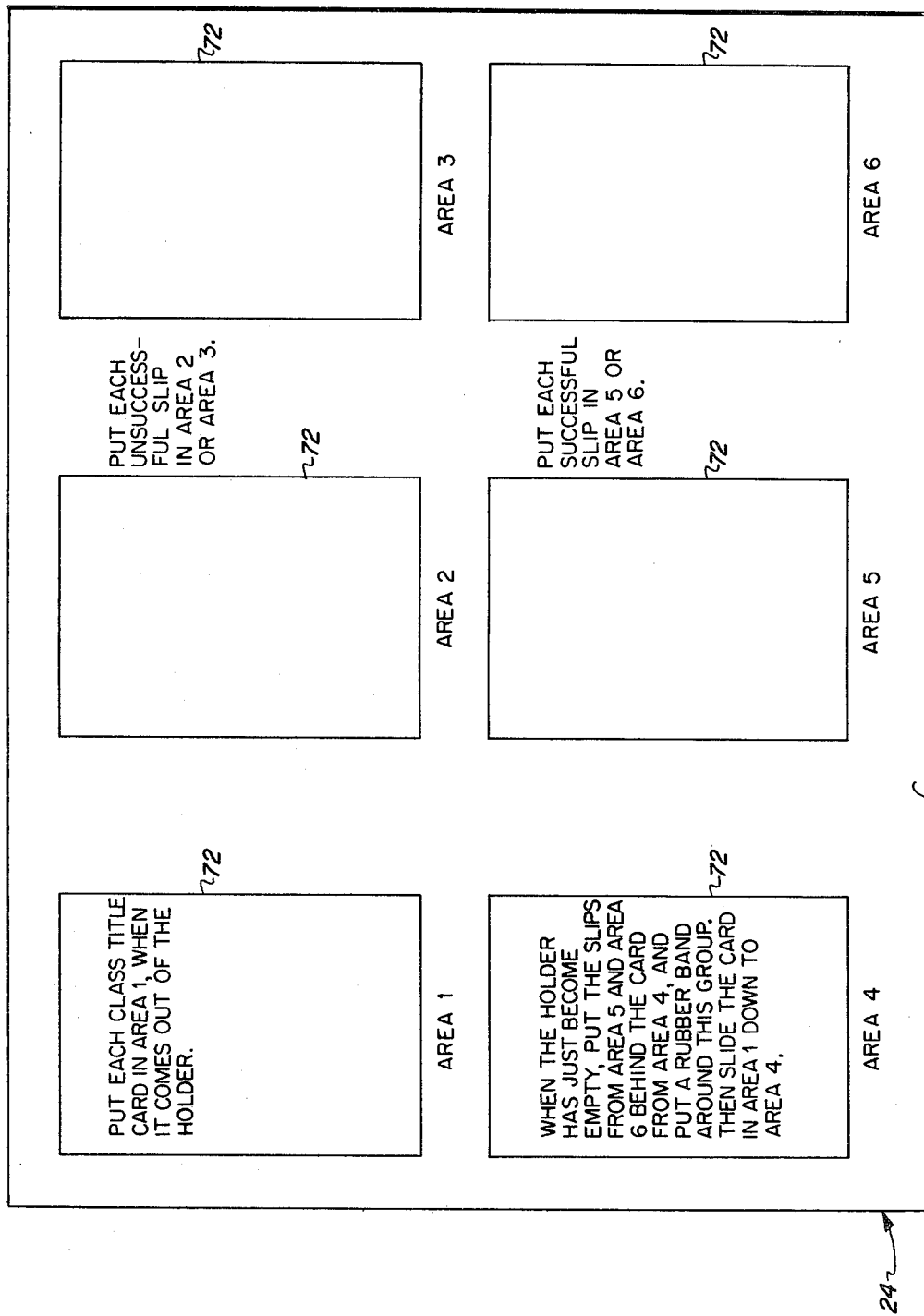
FIG. 5 is a plan view of a tablet which is a component part of the teaching apparatus.

The manipulation of the slips 30 through the grades is accomplished with the aid of manipulation means which includes the holder 22, shown in greater detail in FIG. 4, and the tablet 24, shown in greater detail in FIG. 5.

Holder 22 has for its purpose the holding of a stack 28 of slips 30, usually one stack 28 representing one class in one grade, so that each slip 30 in the stack 28 is displayed in sequence, one at a time. Holder 22 has a base 50 which includes a basal flange 52 and a platform 54 raised above the basal flange 52. Platform 54 has area dimensions similar to the length and width of slips 30 so that a stack 28 of slips 30 can be placed upon the platform 54 and supported thereon. A cover 56 is received over the base 50 and includes depending side walls 58 which will surround the platform 54 so as to telescope with the base 50. The telescopic engagement of the cover 56 with the base 50 enables the accommodation of stacks 28 of different heights while maintaining the cover 56 in place over the base 50. Thus, stacks 28 having varying numbers of slips 30 can be placed in the holder 22.

Cover 56 includes an open transparent window 60 in the opaque top 62 of the cover 56 and a slot 64 adjacent the top 62 of the cover 56. When a stack 28 of slips 30 is in place beneath the cover 56, transparent window 60 will reveal the question 34 appearing on the topmost slip 30 while the opaque top 62 conceals the answer 36. The student or reviewer thus can view the question 34, decide upon an answer, and then reach through the open window 60 to move the topmost slip 30 through slot 64, off the stack 28, and out of the holder 22. The answer 36 then is revealed to the reviewer who will then determine whether or not the particular fact represented on that slip 30 has been memorized. As the slips 30 are removed from the stack 28, one by one, the height of the stack will decrease and the cover 56 will descend over the base 50, always keeping the stack 28 in place in proper alignment within the holder 22 so that each slip 30 can be reviewed by a reviewer who will first view the question 34, while the answer 36 is hidden, and then draw the slip from the stack to reveal the answer.

Once a slip 30 is withdrawn from the holder 22 and the reviewer determines whether or not the fact represented on the slip 30 has been memorized, the slip 30 is placed on the tablet 24. Tablet 24 is in the form of a relatively large board 70 upon which there are delineated a plurality of rectangles 72, each rectangle 72 having dimensions similar to the dimensions of slips 30. The rectangles 72 may be printed on the board surface or may be embossed or debossed. Optionally, rectangles 72 may be delineated by different colors. Each rectangle 72 represents an area which is to receive slips 30, or a class title card 26, in accordance with a prescribed procedure which will be described more fully below. Suffice it to say at this point that the delineated areas are numbered and marked as AREA 1, AREA 2, AREA 3, AREA 4, AREA 5, and AREA 6.

Initially, the student or reviewer will prepare a group of slips 30 which will contain the subject matter that the reviewer wishes to memorize. The group may contain almost any number of slips 30 and preferably includes a rather large number of slips 30, each slip 30 bearing a fact to be learned. The initial group is referred to as the "Callow Group". It is advantageous for the reviewrer himself to prepare the slips 30 for the Callow Group since such an activity can be the beginning of the learning process.

For the purposes of illustration, it has been assumed that the native language of the reviewer is English and that the reviewer desires to learn the meanings of Spanish words, using the vocabularies found in a Spanish grammar book as the source of the material to be learned. Each slip 30 will be prepared by placing a Spanish word or phrase upon the upper half of the face 32 of the slip, as seen in FIG. 2, and placing the English equivalent upon the lower half of the face of the slip. Thus, the question 34 is the Spanish word or phrase and the answer 36 is the English word or phrase. The reviewer will want to use the teaching apparatus 20 for many different subjects. It will be helpful to identify the subject matter to which the fact on a slip 30 pertains so that the reviewer can determine immediately at least the category into which the fact falls. The subject matter identification 37 therefore is located in a position where it will appear in window 60. In this instance, the subject matter is Spanish and each slip is encoded with the abbreviation "sp" at 37 to identify the subject matter. Alternately, the slips bearing common subject matter may all be of one color, and slips of a different color can be used for each different subject. It also may be useful to indicate on each slip the source of the data placed on the slip. Hence, the abbreviation "b.589" appears at 38 in the slip 30 illustrated in FIG. 2 to indicate that the information came from page 589 of the aforesaid Spanish grammar book. A single Callow Group or multiple Callow Groups can be prepared for a wide variety of subjects, with each slip of every Callow Group bearing information in the form of a question and an answer.

Teaching apparatus 20 is used in accordance with a prescribed routine of repetitive review of the slips 30 so as to enable a reviewer to memorize or learn the information carried by the slips. The use of the teaching apparatus in accordance with the prescribed routine assures a more frequent review of unlearned items of information as compared to learned items during the course of the routine, thus rendering the learning process more efficient and more effective. Where the slips 30 are to be reviewed daily, a daily routine has been devised which will assure that all of the slips 30 will be reviewed over a period of thirty-two days. A weekly routine has been devised for use in connection with the daily routine in order to provide for less frequent review of items of information learned during the daily routine. The grades and classes which appear on the class title cards 26 for the daily routine, toegther with the source grade and class for each card, are as follows:

| DAILY ROUTINE |
| --- |
| 8.01 from 7.01 from 6.1 from 5.1 from 4.1 from 3.1 from 2.1 from 1.1 |
| 8.02 from 7.02 from 6.2 from 5.2 from 4.2 from 3.1 |
| 8.03 from 7.03 from 6.3 from 5.3 from 4.1 |
| 8.04 from 7.04 from 6.4 from 5.4 from 4.2 |
| 8.05 from 7.05 from 6.5 from 5.1 |
| 8.06 from 7.06 from 6.6 from 5.2 |
| 8.07 from 7.07 from 6.7 from 5.3 |
| 8.08 from 7.08 from 6.8 from 5.4 |
| 8.09 from 7.09 from 6.1 |
| 8.10 from 7.10 from 6.2 |
| 8.11 from 7.11 from 6.3 |
| 8.12 from 7.12 from 6.4 |
| 8.13 from 7.13 from 6.5 |
| 8.14 from 7.14 from 6.6 |
| 8.15 from 7.15 from 6.7 |
| 8.16 from 7.16 from 6.8 |
| 8.17 from 7.01 |
| 8.18 from 7.02 |
| 8.19 from 7.03 |
| 8.20 from 7.04 |
| 8.21 from 7.05 |
| 8.22 from 7.06 |
| 8.23 from 7.07 |
| 8.24 from 7.08 |
| 8.25 from 7.09 |
| 8.26 from 7.10 |
| 8.27 from 7.11 |
| 8.28 from 7.12 |
| 8.29 from 7.13 |
| 8.30 from 7.14 |
| 8.31 from 7.15 |
| 8.32 from 7.16 |

The grades and classes which appear on the class title cards 26 for the weekly routine, together with the source grade and class for each card, are as follows:

| WEEKLY ROUTINE |
| --- |
| 12.01 from 11.01 from 10.01 from 9.1 |
| 12.02 from 11.02 from 10.02 from 9.2 |
| 12.03 from 11.03 from 10.03 from 9.3 |
| 12.04 from 11.04 from 10.04 from 9.4 |
| 12.05 from 11.05 from 10.05 from 9.5 |
| 12.06 from 11.06 from 10.06 from 9.6 |
| 12.07 from 11.07 from 10.07 from 9.7 |
| 12.08 from 11.08 from 10.08 from 9.8 |
| 12.09 from 11.09 from 10.09 from 9.1 |
| 12.10 from 11.10 from 10.10 from 9.2 |
| 12.11 from 11.11 from 10.11 from 9.3 |
| 12.12 from 11.12 from 10.12 from 9.4 |
| 12.13 from 11.13 from 10.13 from 9.5 |
| 12.14 from 11.14 from 10.14 from 9.6 |
| 12.15 from 11.15 from 10.15 from 9.7 |
| 12.16 from 11.16 from 10.16 from 9.8 |
| 12.17 from 11.17 from 10.01 |

| -continued |
| --- |
| WEEKLY ROUTINE |
| 12.18 from 11.18 from 10.02 |
| 12.19 from 11.19 from 10.03 |
| 12.20 from 11.20 from 10.04 |
| 12.21 from 11.21 from 10.05 |
| 12.22 from 11.22 from 10.06 |
| 12.23 from 11.23 from 10.07 |
| 12.24 from 11.24 from 10.08 |
| 12.25 from 11.25 from 10.09 |
| 12.26 from 11.26 from 10.10 |
| 12.27 from 11.27 from 10.11 |
| 12.28 from 11.28 from 10.12 |
| 12.29 from 11.29 from 10.13 |
| 12.30 from 11.30 from 10.14 |
| 12.31 from 11.31 from 10.15 |
| 12.32 from 11.32 from 10.16 |
| 12.33 from 11.01 |
| 12.34 from 11.02 |
| 12.35 from 11.03 |
| 12.36 from 11.04 |
| 12.37 from 11.05 |
| 12.38 from 11.06 |
| 12.39 from 11.07 |
| 12.40 from 11.08 |
| 12.41 from 11.09 |
| 12.42 from 11.10 |
| 12.43 from 11.11 |
| 12.44 from 11.12 |
| 12.45 from 11.13 |
| 12.46 from 11.14 |
| 12.47 from 11.15 |
| 12.48 from 11.16 |
| 12.49 from 11.17 |
| 12.50 from 11.18 |
| 12.51 from 11.19 |
| 12.52 from 11.20 |
| 12.53 from 11.21 |
| 12.54 from 11.22 |
| 12.55 from 11.23 |
| 12.56 from 11.24 |
| 12.57 from 11.25 |
| 12.58 from 11.26 |
| 12.59 from 11.27 |
| 12.60 from 11.28 |
| 12.61 from 11.29 |
| 12.62 from 11.30 |
| 12.63 from 11.31 |
| 12.64 from 11.32 |

A prescribed series of steps is followed in carrying out the daily routine. Initially, every class is emply out and all that the reviewer has is a Callow Group of slips 30 and a complete set of class title cards 26, as set forth above. No slips 30 accompany any class title card 26 at the beginning of the routine. Gradually, however, over a period of several weeks, all of the classes will be filled, and eventually every class title card 26 will have some slips associated with the card. The steps are as follows:

STEP 1: The daily routine is started with a class from Grade 8. Preferably, Class 8.01 is used on the first day, Class 8.02 on the second day, and so on through Class 8.32. On the thirty-third day, the routine is started again with Class 8.01.

STEP 2: The class title card 26 for the particular day of the routine is placed in the holder 22 on that day, together with any slips 30 associated with that class title card. The class title card 26 will be at the top of a stack 28 of slips 30, if any, and the stack will be placed upon the platform 54 of the holder with the printing on the class title card 26 facing upwardly. The cover 56 is then telescoped over the stack 28 and over the platform 54 so that the grade and class printed on the class identification card appears in the window 60 of the cover 56.

STEP 3: The class identification card 26 is pulled from the holder 22, through slot 64, and is placed, face up, in AREA 1 of the table 24.

STEP 4: If the holder 22 is empty, the reviewer will proceed directly to STEP 6, below. If, however, there remains in the holder 22 at least one slip 30, the slip 30 which is immediately beneath the cover 56 is in position for viewing the question 34 carried by that slip and the receiver will perform STEP 5.

STEP 5: The reviewer views the question 34 appearing in the window 60 and attempts to recall the hidden answer 36. The reviewer then pulls the slip 30 out of the holder 22, through slot 64, and views the answer 36. If the reviewer knew the correct answer 36, the slip 30 is placed, face up, in AREA 5 or in AREA 6 of the tablet 24. If the reviewer did not know the correct answer 36, the slip 30 is placed, face up, in AREA 2 or in AREA 3 of the tablet. The reviewer then returns to STEP 4.

STEP 6: If there is a class identification card 26 in AREA 4, the reviewer proceeds directly to STEP 8.

STEP 7: The reviewer removes any slips 30 from AREAS 5 and 6 and places these slips beneath the class identification card 26 in the class of Grade 9 that was most recently emptied during the weekly routine; however, if a weekly routine has not yet been commenced, these slips 30 may be placed in any class in Grade 9. The reviewer then proceeds directly to STEP 10.

STEP 8: The reviewer removes any slips 30 from AREAS 5 and 6 and places these slips 30 behind the class identification card 26 located in AREA 4. The stack thus formed in AREA 4 is temporarily fastened together, as with a rubber band, and put aside. The slips 30 in AREAS 2 and 3 remain there.

STEP 9: If class 1.1 is in AREA 1, the reviewer proceeds directly to STEP 11.

STEP 10: The class identification card 26 in AREA 1 is transferred to AREA 4. The reviewer determines the source which appears on that class identification card 26 and which dictates the next class identification card, and the stack of slips 30 associated with that next class identification card. That next class identification card, and any slips associated therewith, then will be placed in the holder 22, and the reviewer returns to STEP 2 to do so.

STEP 11: The reviewer removes about twelve slips 30 from the Callow Group and places them in AREA 3 of the tablet 24. All of the slips 30 in AREAS 2 and 3 then are placed beneath the class identification card located in AREA 1. The stack thus formed in AREA 1 is fastened together temporarily, as with a rubber band, and is removed from the tablet 24. That ends the daily routine.

Figure 6:
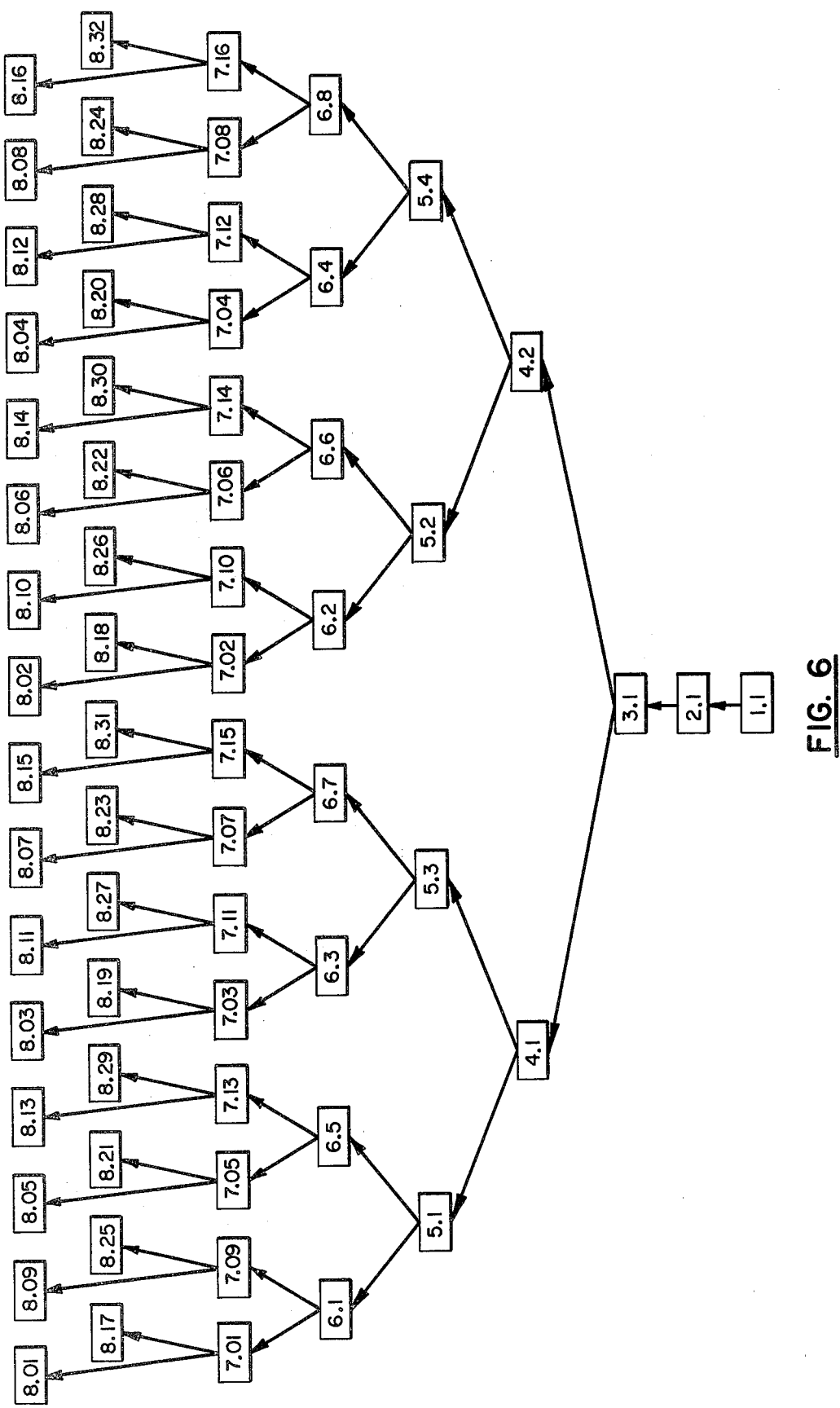
FIG. 6 is a flow diagram illustrating the sequence of review of information to be memorized utilizing the teaching apparatus.

As will be seen from the above prescribed steps, the daily routine, if followed precisely, will result in the more frequent repetitive review of those slips 30 bearing information which has not been memorized, while those slips bearing information which has been memorized will not be reviewed as frequently. The frequency of review is determined by the rapidity with which the slips are promoted from grade to grade, and the prescribed routine enables automatic promotion of learned information and more frequent review of unlearned information. The sequence of the review described above is illustrated in the flow diagram of FIG. 6.

The slips that fail to get promoted from one grade to another contain the material that requires the greatest attention. In most instances, reviewing a slip two or three times as the slip is placed on the tablet will make a sufficiently strong impression on the mind of the reviewer so that the information will be learned by the next review. However, if a slip is returned repeatedly to Grade 1, it will be necessary to make an extra effort to learn the information carried by that slip.

After progressing through all of the Grades 1 through 8, the slips 30 are promoted to the weekly routine. Ordinarily, the weekly routine is started after the daily routine has been in progress for about three months. The weekly routine is performed in the same way as the daily routine, with the following four exceptions:

Exception 1: The weekly routine is performed approximately once a week, preferably on a day when the reviewer has more time than is usually available for devotion to study.

Exception 2: The weekly routine always begins with a class from Grade 12 (instead of Grade 8). Usually, Class 12.01 is used in the first week, Class 12.02 in the second week, and so on.

Exception 3: The weekly routine is ended when a class in Grade 9 is emptied. This is the class into which will be placed the slips that will be promoted from Grade 8 during the following week.

Exception 4: The slips from AREAS 2 and 3 are placed at the beginning of the Callow Group.

In selecting the proper areas of the tablet 24 for the placement of slips 30, it is best to use AREA 2 and AREA 3 alternately, and AREA 5 and AREA 6 alternately. These alternate areas are provided so as to enable automatic rearrangement, or shuffling, of the slips. In that manner slips which were reviewed consecutively in one review will not be reviewed in the same sequence in a subsequent review. Thus, using the areas alternately provides optimum shuffling. Of course, alternate areas are not necessary where automatic shuffling is not desired.

It will be apparent from the above description that the teaching apparatus 20 enables a reviewer to organize, deal with and learn a very large number of facts merely by following a regular prescribed routine. The prescribed routine provides for a continually decreasing frequency of review of those facts learned during the course of the routine, while assuring that unlearned facts are reviewed more frequently. Thus, time is conserved and the learning process becomes more efficient as well as more effective. The added feature of shuffling, or rearrangement, of the information-bearing slips within a group aids in the learning of individual facts independent of other facts in the group. The entire teaching apparatus is simple, can be constructed of relatively inexpensive materials and is truly portable. Since the slips can be prepared readily by the reviewer in any number for almost any subject matter, the potential for use of the teaching apparatus is practically without limit.

It is to be understood that the above detailed description of an embodiment of the invention is provided by way of example only. Various details of design and construction may be modified without departing from the true spirit and scope of the invention as set forth in the appended claims.

The embodiment of the invention in which an exclusive property or privilege is claimed are defined as follows:

1. Apparatus for enabling a reviewer to review items of information to be learned by the reviewer in accordance with a prescribed routine of repetitive review of a plurality of information-bearing elements, each element carrying an item of information to be reviewed, the apparatus and routine ensuring a more frequent review of unlearned items as compared to learned items during the course of the routine, said apparatus comprising:

classification means for defining a plurality of grades, the grades being arranged in a given sequence from lower grades to higher grades and for defining classes within the grades, the number of classes within each grade being greater in the higher grades than in the lower grades; and manipulation means for enabling the review and successive grouping of the elements within groups of prescribed classes and grades in accordance with one of two choices made by the reviewer upon each review of the item of each element, the choices being based upon learned items and unlearned items, said manipulation means including grouping means for effecting said grouping of the elements in response to each choice so as to determine the frequency of review of the corresponding item subsequent to that choice as the element carrying that item follows the given sequence through the grades and classes to enable a more frequent review of unlearned items as compared to learned items during the course of the routine.

2. The invention of claim 1 wherein the classification means includes a set of members bearing indicia, each member having indicia representing a particular grade and class within that grade.

3. The invention of claim 2 wherein the information-bearing elements are in the form of slips and the members are in the form of cards to be associated with groups of said slips.

4. The invention of claim 1 wherein the manipulation means includes rearranging means for assuring that when any two of the information-bearing elements are arranged for consecutive review once during the course of the prescribed routine, those information-bearing elements will now be so arranged again during the course of the same routine.

5. The invention of claim 1 or 4 wherein the classification means includes a set of members bearing indicia, each member having indicia representing a particular grade and class within that grade and the manipulation means includes a board having delineated areas thereon, the delineated areas including two first areas for receiving, respectively, two of said members, and at least one second area associated with each first area for receiving groups of said information-bearing elements in accordance with each choice.

6. The invention of claim 5 wherein the information-bearing elements are in the form of slips and the members are in the form of cards to be associated with groups of said slips.

7. The invention of claim 6 including at least two second areas associated with each first area to enable shuffling of the slips as the choices are made by the reviewer.

8. The invention of claim 1, 2, 3 or 4 wherein each successive grade has up to twice as many classes as the next previous grade.

9. The invention of claim 1, 2, 3 or 4 wherein each successive grade of at least the highest three grades has twice as many classes as the next previous grade.

10. The invention of claim 1 wherein the manipulation means includes a holder for holding the information-bearing elements of at least those elements grouped into one grade and class, the holder having selection means for enabling selective removal of one element at a time from the group held in the holder.

11. The invention of claim 10 wherein the holder includes:

a base including a raised platform for supporting the group of elements in stacked arrangement; and a cover received over the base to surround the platform and the group of elements stacked thereon so as to maintain the integrity of the stacked arrangement;

the cover being engaged telescopically with the base in order to enable relative movement between the cover and the platform so as to accommodate groups of varying height, with the cover surrounding the group of elements stacked on the platform, without disengagement of the cover from the base, whereby groups of varying numbers of elements will be accommodated in the holder.

12. The invention of claim 10 or 11 wherein the information-bearing elements are in the form of slips, the information is in the form of question and answer and the holder includes means for revealing the question while hiding the answer, said selection means being arranged so as to reveal the hidden answer upon the selective removal of each slip from the stacked arrangement.

13. In an apparatus for enabling a reviewer to review items of information to be learned by the reviewer in accordance with a prescribed routine of repetitive review of a plurality of information-bearing elements, each element carrying an item of information to be reviewed, a holder for holding a group of such elements in stacked arrangement for sequential review, said holder comprising:

a base including a raised platform for supporting the group of elements in stacked arrangement; and a cover for being received over the base and the group of elements to surround the platform and the group of elements stacked thereon so as to maintain the integrity of the stacked arrangement;

the cover being capable of telescopic engagement with the base in order to enable relative movement between the cover and the platform for the accommodation of groups of varying numbers of elements with the cover in engagement with the base and surrounding the group of elements stacked on the platform; and selection means for enabling sequential withdrawal of the elements from the stacked arrangement while the cover is engaged with the base.

14. The invention of claim 13 wherein the items of information are carried by the information-bearing elements in the form of questions and answers and the holder includes means for revealing a question on an element while hiding the corresponding answer.

15. The invention of claim 14 wherein the cover includes a top and the means for revealing the question includes a window in the top of the cover for enabling viewing of the question on said element, the cover further including a slot adjacent the top for enabling selective removal of said element from the stacked arrangement for viewing of the answer.

* * * * *